Feb. 11, 1936.  L. L. KAHN  2,030,639
STOVE
Filed Aug. 3, 1931
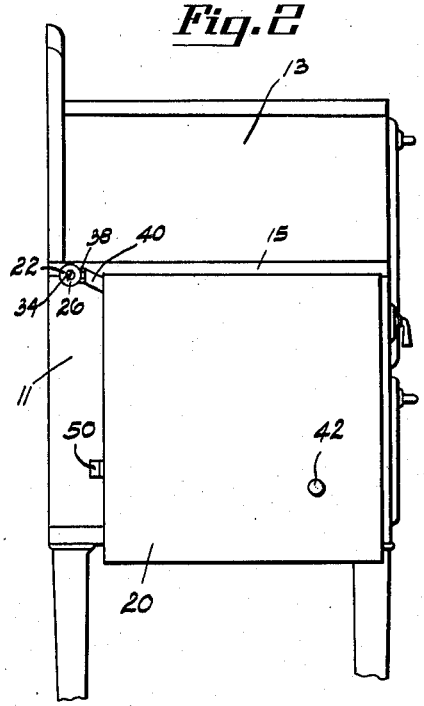
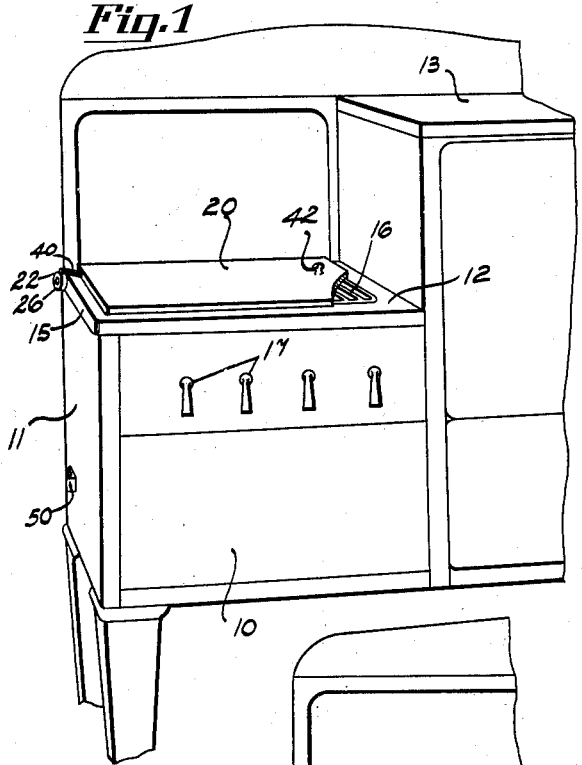
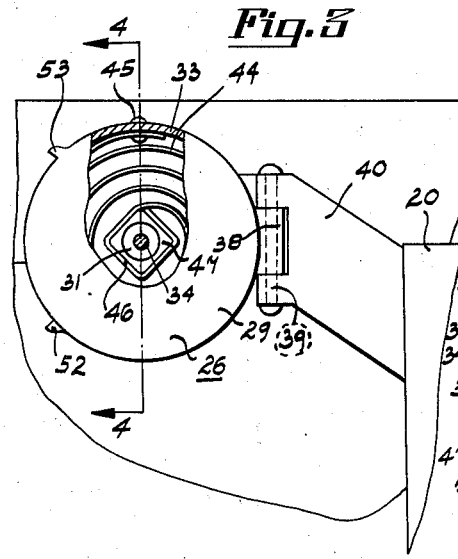
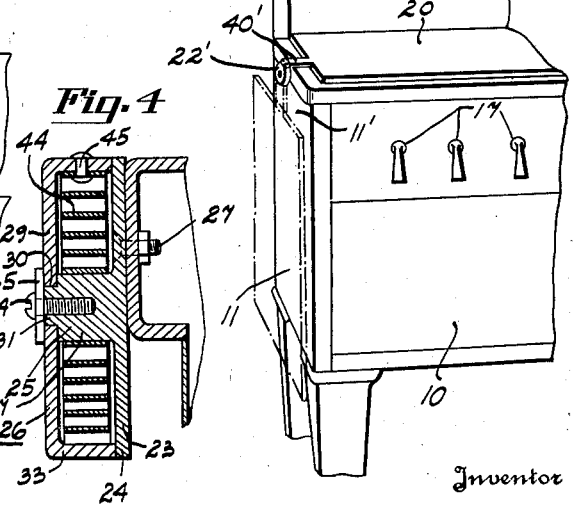
Inventor
Lucian L. Kahn
By Maréchal & Noe
Attorney Patented Feb. 11, 1936

2,030,639

UNITED STATES PATENT OFFICE 2,030,639

STOVE

Lucian L. Kahn, Hamilton, Ohio, assignor to The Estate Stove Company, Hamilton, Ohio, a corporation of Ohio Application August 3, 1931, Serial No. 554,715

8 Claims. (Cl. 126—214)

This invention relates to stoves.

One of the principal objects of the invention is the provision of a removable cooking top stove cover of simple construction attached to the stove in a manner permitting movement of the cover from a position serving as a closure for the cooking top to a position in which the cover is suspended at the stove side out of the way of the stove operator.

Another object of the invention is the provision of a stove cooking top cover having a hinge connection with the stove such that the cover may be readily moved from the closure position over the cooking top to a position at the stove side even though the stove is so closely confined that but little space is available at the stove side from which the cover is suspended.

Other objects and advantages of the invention will be apparent from the following description, the accompanying drawing and the appended claims.

In the drawing, which illustrates preferred embodiments of the invention—

Fig. 1 is a view in perspective of a portion of a stove having a cooking top cover member constructed in accordance with the present invention; the cover member being shown in position of closure;

Fig. 2 is a side elevational view of the stove showing the cover member in the position of suspension at the stove side;

Fig. 3 is a fragmentary view of the cover member hinge attachment; a portion being broken away for clearness of illustration;

Fig. 4 is a sectional view taken on the line 4—4 of Fig. 3; and

Fig. 5 is a fragmentary view in perspective showing a cover member having a somewhat different form of attachment.

The drawing, in which like characters of reference designate like parts throughout the several views thereof, illustrates a cooking stove which comprises a body portion defined in part by a front wall 10 and a side wall 11, and having a cooking top 12 and an oven 13 forming part of the stove structure. As shown, the cooking top 12 is defined by a frame 15 which serves as a bounding rim and also as a support for a grill 16. The grill 16 provides supporting means for vessels placed over the cooking top burners which are positioned beneath the grill 16 in the usual manner, and controlled in their operation by means of the valve handles 17.

A cooking top member 20 is provided to serve as a closure or cover for the cooking top during times that the stove is out of service, and is shown proportioned as to size so that when in the position of closure the grill 16 is effectively enclosed by the member 20. The cover member 20 may be formed in any suitable manner, such as from sheet metal, and is preferably shaped to provide a flat top surface which, when in the position of closure, serves in effect as a table top.

The cover member 20 comprises an integral part of the stove structure by being attached thereto through the medium of a hinge which permits the cover member to be readily moved from the position of closure to a position of suspension at the stove side. By so attaching the cover member to the stove structure it is not only retained in such a way that it may not become detached and eventually misplaced but also, by being so suspended the cover may not fall through careless handling and thus become broken or in any way injured.

As shown particularly in Figs. 1 to 4, a hinge structure 22 is provided at the upper rear corner of the stove side 11 adjacent the cooking top 12. The hinge structure comprises an assembly of members having perpendicularly related axes whereby the cover member may be easily moved between the positions of closure and of suspension at the stove side. As shown, the hinge structure comprises a supporting member 23 having a disk like plate portion 24 from which a stud 25 projects perpendicularly to serve as an axis for the pivotal movement of the hinge body 26. The hinge member 23 is attached to the side of the cooking top frame 15 by provision of bolts 27. The hinge body 26 is of cup like form and comprises a plate portion 29 having a central circular opening 30 which is received upon a cylindrical extension 31 of the stud 25. The cylindrical rim 33 of the body 26 is proportioned as to depth so that when received upon the supporting member 23 and attached thereto by means of the screw 34 and washer 35 the free edge of the portion 33 will stand in sliding contact with the disk portion 24 of the supporting member 23. The hinge body 26 has formed thereon a lug 38 which is drilled to receive a hinge pin 39 whereby the hinge member 40, projecting from the cover 20, may be pivotally attached to the hinge body 26.

The pivotal axes of the hinge structure, comprising the cylindrical stud portion 31 and the hinge pin 39, are perpendicularly related and these together with the hinge member 40 are so proportioned that the cover member 20 may rest on the cooking top as a closure therefor in such position as to stand symmetrically with respect to the outline of the cooking top frame 15. Also, the proportioning of these parts is such that when the cover 20 stands in the suspended position at the stove side the cover member will stand within the confines of the outline of the stove side.

A handle 42 is provided on the cover member 20 for the convenience of the stove user and is positioned to be readily accessible when it is desired to move the cover member from one position to another. As a further aid to the user of the stove when moving the cover from one position to another a spring 44 is incorporated in the hinge structure to resist the force of gravity tending to pull the cover member toward the position of suspension. As shown, one end of the spring 44 is attached to the flange portion of the hinge body 26 by provision of a rivet 45 while the other end of the spring is formed, as indicated at 46, to be received upon the squared portion 47 of the stud 25. When it is desired to remove the cover from the position of closure to the suspended position the operator grasps the handle 42 and swings the cover upwardly into a vertical plane about the hinge pin 39 as an axis, and then swings the cover member downwardly in this vertical plane about the cylindrical stud portion 30 as an axis. This may be readily accomplished by one hand. The downward movement of the cover member is limited by a projecting member 50 which extends from the stove side in such position as to retain the cover member square with the stove side.

As a further aid to guiding the cover member from one position to another the hinge structure may be provided with interengaging stops whereby the tension of the spring 44 is restrained when the hinge structure stands so that the hinge pin 39 provides a horizontal axis for movement of the cover member thereabout. As shown, an extending lug 52 projects from the hinge supporting member 23 in such manner as to interengage a lug 53 which projects from the hinge body 26; the members being spaced with respect to one another so as to come in contact when the hinge pin axis lies horizontally and thus restrain further movement of the hinge body by the tensioned spring 44.

By positioning the hinge structure toward the rear of the stove it is only necessary to swing the cover member from closure through an angle of 90° to the vertical plane, and then through 90° to the position of suspension. At no time does the cover member project a distance further removed from the stove than the vertical plane of movement which lies closely adjacent the stove side.

The hinge structure shown in Fig. 5 is attached to the midpoints of the stove side 11' and the cover 20' so that upon swinging this cover member from the position of closure about the axis of the hinge member 40' into a vertical plane, the cover member is then swung through an angle of 180° about the axis 30' to a position of suspension at the stove side in which the cover member hangs in balance by the force of gravity and so stands squarely related to the stove side. The hinge structure 22' of this construction comprises perpendicularly related axes and, like the hinge structure 22, does not require any more space for its movement than an amount sufficient to swing the cover member to a vertical plane closely adjacent the side of the stove. Both forms of hinge structure permit movement of the cover member through the use of only one hand and serve as a simple means for accurately guiding the cover member from one position to another.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed:

1. In a stove having a cooking top defined by a frame enclosing a grill with burners therebeneath, a movable cover member receivable on the cooking top as a closure for the grill, hinge means comprising perpendicularly related axes for attaching the cover member to the stove for guidance of the cover member from the position of closure to a position of suspension at the stove side, one of said axes standing perpendicularly to the stove side, and stop means projecting from the stove side across the plane of the other of said axes to position the cover member in suspension at the stove side.

2. In a stove having a cooking top defined by a frame enclosing a grill with burners therebeneath, a removable cover member receivable on the cooking top as a closure for the grill, hinge means attaching the cover plate to the stove, said hinge means comprising a hinge body having a pivotal connection with the cover plate for movement of the cover plate on a horizontal axis from the position of closure to a position in which the cover member stands in a vertical plane at the stove side and above the plane of the cooking top, and a pivotal connection between the hinge body and the stove for movement of the cover member in the vertical plane to a position of suspension from the hinge body in which the cover member lies below the plane of the cooking top.

3. In a stove having a cooking top, a removable cover member receivable on the cooking top as a closure, hinge means attaching the cover plate to the stove, said hinge means comprising a hinge body having a pivotal connection with the cover plate for movement of the cover plate on a horizontal axis from the position of closure to a position in which the cover member stands in a vertical plane at the stove side, a second pivotal connection between the hinge body and the stove for movement of the cover member in the vertical plane to a position of suspension from the hinge body, and means for resisting the force of gravity tending to move the cover member to the suspended position while pivoted for movement about the second pivotal connection between the hinge body and the stove.

4. In a stove having a cooking top defined by a frame enclosing a grill with burners therebeneath, a removable cover member receivable on the cooking top as a closure for the grill, hinge means attaching the cover plate to the stove, said hinge means comprising a hinge body having a pivotal connection with the cover plate for movement of the cover plate on a horizontal axis from the position of closure to a position in which the cover member stands in a vertical plane at the stove side, a second pivotal connection between the hinge body and the stove for movement of the cover member in the vertical plane to a position of suspension from the hinge body, and a spring tensioned between the hinge body and the stove to resist the force of gravity tending to move the cover member to the suspended position while pivoted for movement about the second pivotal connection between the hinge body and the stove.

5. In a stove having a cooking top, a cover member therefor, means for guiding the cover member from a position of closure over the cooking top to a position of suspension at the stove side, said guiding means comprising a pivot axis movable in a plane parallel the stove side, stop means on the guiding means to limit movement of the pivot axis in one direction to a position wherein the pivot axis is held parallel with the cooking top, and resilient means urging movement of the guiding means toward the position of engagement of the stop means.

6. In a stove having a cooking top, a cover member therefor, means for guiding the cover member from a position of closure over the cooking top to a position of suspension at the stove side, said guiding means comprising a pivot axis movable in a plane parallel the stove side, stop means on the guiding means positioned to engage upon movement of the pivot axis in one direction to thus position the pivot axis parallel with the cooking top, and a spring in the guiding means acting to restrain movement of the guiding means from the position wherein the pivot axis stands in parallel relationship with the cooking top.

7. In a stove having a cooking top, a cover therefor, and means connecting the cover to the cooking top for guidance of the cover from a position over the cooking top as a closure therefor with the cover upper side exposed to a position of suspension at the stove side in which at least the major portion of the cover stands below the level of the cooking top and the said mentioned upper side is exposed, said means comprising a hinge member attached to the stove, a hinge member pivotally connected to the first mentioned member, and means on the cover movably attached to said pivotally connected member.

8. In a stove having a cooking top, a cover member receivable on the cooking top as a closure therefor, means movably connecting one rearward corner of the cover to the stove comprising a hinge member fixed to the stove adjacent the rear of the cooking top and providing a pivot axis extending in a horizontal plane parallel the stove front, a hinge plate pivotally connected to the stove hinge member and having a pivot axis extending perpendicularly to the first mentioned pivot axis, a cover hinge member fixed to a rearward corner of the cover and pivotally attached to the hinge plate, said connecting means affording pivotal movement of the cover about the attached corner and providing for movement of the cover from the plane of the cooking top to a plane transverse thereto.

LUCIAN L. KAHN.